United States Patent
Kutner

[15] 3,666,715
[45] May 30, 1972

[54] STABILIZED COMPOSITION COMPRISING α-OLEFIN POLYMERS AND MELAMINE

[72] Inventor: Abraham Kutner, Wilmington, Del.
[73] Assignee: Hercules Incorporated, Wilmington, Del.
[22] Filed: July 8, 1970
[21] Appl. No.: 53,275

Related U.S. Application Data

[63] Continuation-in-part of Ser. No. 625,308, Mar. 23, 1967, abandoned.

[52] U.S. Cl. ..................260/45.8 N, 117/232, 260/45.7 S, 260/45.85, 260/45.95
[51] Int. Cl. ...........................................................C08f 45/60
[58] Field of Search ............260/45.8 N, 41 C, 45.85, 45.78, 260/45.95

[56] References Cited

UNITED STATES PATENTS 3,181,971   5/1965   Rayner ..............................260/45.85

FOREIGN PATENTS OR APPLICATIONS

43/29,756   3/1968   Japan

*Primary Examiner*—Donald E. Czaja
*Assistant Examiner*—V. P. Hoke
*Attorney*—Edwin H. Dafter, Jr.

[57] ABSTRACT

The resistance of α-olefin polymers to copper induced oxidation is improved by adding thereto 0.01 to 2 percent melamine along with conventional antioxidants and light stabilizers. The efficiency of the melamine as a stabilizer is improved if the particle size is below about 55μ.

6 Claims, No Drawings

STABILIZED COMPOSITION COMPRISING α-OLEFIN POLYMERS AND MELAMINE

This application is a continuation-in-part of my copending U.S. application Ser. No. 625,308, filed Mar. 23, 1967 and now abandoned.

This invention relates to propylene polymer compositions suitable for use as coating materials for copper articles.

It is known that olefin polymers such as stereoregular polypropylene undergo rapid oxidative degradation and become brittle and useless when in the presence of copper, particularly at elevated temperatures. This degradation does not appear to be prevented by even the best stabilizer-antioxidant systems known in the art. Since these polymers otherwise have excellent mechanical and electrical properties which make them excellent candidates for such uses as electrical wire insulation, electrical condensers, and moldings with copper inserts, the art has found it necessary to seek out ways to prevent this degradation.

The most likely method for preventing copper-induced degradation is by the addition of a copper antagonist thereto and several such additives have been disclosed by the prior art. For example, U.S. Pat. No. 3,239,484 teaches the use of oxanilide in conjunction with a crotonaldehyde-phenol condensation product to retard metal induced degradation. U.S. Pat. No. 3,181,971 teaches use of certain aliphatic and aromatic amines having boiling points greater than about 200° C. in combination with phenolic antioxidants and an organic compound containing divalent sulfur. U.S. Pat. No. 3,296,188 teaches the use of hydrazone compounds containing as a substituent a six membered heterocyclic nitrogen radical, a phenol and, optionally, an organic sulfur compound.

The additives disclosed by the prior art for improving resistance to copper induced degradation perform effectively but are subject to other objections. For example, oxanilide and oxamide are difficult to disperse uniformly in the polymer and affect electrical properties adversely. The hydrazones are not usually available commercially in quantity and are thus quite expensive.

Now in accordance with this invention it has been found that the oxidation stability of stereoregular polyolefins in the presence of copper can be substantially increased by the addition thereto of a specified amount of melamine (2,4,6 s-triazine) in addition to conventional heat stabilizers. More specifically, the invention is a composition which exhibits good resistance to oxidative degradation in the presence of copper which comprises a heat stabilized polymer of an α-olefin containing as a copper antagonist, about 0.01 to 2 percent melamine, preferably 0.03 to 0.5 percent based on the weight of the olefin polymer.

Melamine shows a number of advantages over copper inhibitors disclosed in the art. It is not volatile under the conditions of use, shows little tendency to exude from the polymer, and its presence in the polymer does not adversely affect electrical properties. Additionally, it is readily available in carload lots at a low price. It has been found to disperse well in the polymer even though it is not soluble therein.

The polymers to which the instant invention is applicable include the crystalline homopolymers of ethylene and α-olefins having three to six carbon atoms as well as copolymers of any one of these olefins containing a minor proportion of at least one other of the group. Thus, they include, e.g., polyethylene, polypropylene, poly(butene-1), poly(3-methyl butene-1), and crystalline copolymers thereof. In particular, the invention is applicable to homopolymers of propylene and those copolymers containing up to about 25 percent ethylene which are still predominantly crystalline. These can be either of the random (statistical) type or the so-called block copolymers.

The α-olefin polymers with which the present invention is concerned are stabilized against the degradative effects of heat by known antioxidant or heat stabilizer systems. Exemplary of such systems are the synergistic combinations of hindered phenols and organic compounds containing divalent sulfur. These materials are normally employed in concentrations of about 0.01 to 2 percent, preferably 0.05 to 0.5 percent.

Exemplary phenolic antioxidants are those containing more than one phenolic residue and having a sterically blocking group on at least one carbon atom adjacent to each phenolic hydroxyl group as represented by the following structural formula:

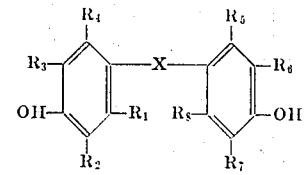

where X is a mono- or disulfide group or is

and the R substituents on the phenolic nuclei are aliphatic or cycloaliphatic hydrocarbon radicals, alkoxy groups or hydrogen, with at least one branched or blocking hydrocarbon group ortho to each hydroxyl group on a phenolic nucleus, and $R_9$ and $R_{10}$ are alkyl radicals, hydroxyaryl radicals, hydroxyaryl substituted hydrocarbon radicals, cycloalkyl radicals or hydrogen atoms. Examples of suitable phenolic antioxidants in the above class are those formed by condensing a phenol with an aldehyde or ketone or with a sulpher mono- or dichloride. For an exhaustive listing of useful phenolic antioxidants in this class and discussion of their preparation, reference can be had to Rayner, U.S. Pat. No. 3,181,971.

Another type of polyphenolic compound which has been found useful is the pentaerythritol ester of β-phenylpropionic acid having the structural formula:

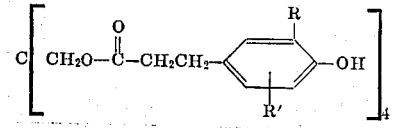

where R is a branched, blocking hydrocarbon radical and R' is a hydrocarbon radical or hydrogen.

Other useful phenolic compounds are the mesitylene trisphenols of the formula;

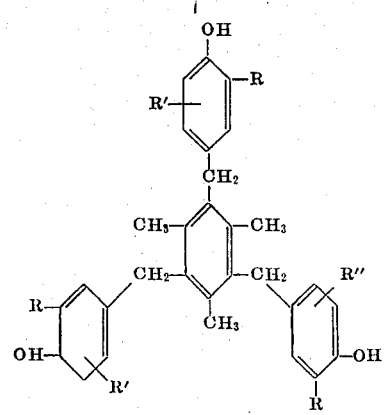

where R and R' are as described for the pentaerythritol esters.

Among all of the phenolic compounds embraced in the above classes, the following have been found to be particularly effective in combination with melamine according to this invention: pentaerythritol tetra-β(4-hydroxy-3,5-di-t-butylphenyl propionate), crotonaldehyde--3-methyl -6-t-butylphenol condensation product, butyraldehyde--3-methyl-6-t-butylphenol condensation product, 3-methyl-6-t-butylphenol--sulfur dichloride condensation product, and 2,4,6-tris(4-hydroxy-3,5-di-t-butylbenzyl) mesitylene.

The main classes of organic sulfur compounds which are used are (1) mercaptans, thioethers and disulfides and (2) diesters of thiodialkanoic acids. Additionally, when the phenolic compound is of the thiobisphenol type, this additive can perform in the same manner as the synergistic combinations and thus can serve as both phenolic antioxidant and sulfur-containing compound.

Mercaptans suitable for use in the invention include, e.g., n-hexadecyl mercaptan, and n-octadecyl mercaptan. Typical organic thioethers and disulfides include, e.g., dilauryl sulfide, dilauryl disulfide, di-n-hexadecyl sulfide, di-n-octadecyl disulfide, and polymeric thioethers and disulfides such as polydecamethylene sulfide, polytrimethylene disulfide and polydecamethylene disulfide.

Thiodialkanoic acid esters useful in the invention are those having the formula:

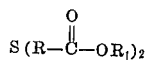

where R is an alkyl radical having about two to five carbon atoms and $R_1$ is an alkyl radical having about 10 to 20 carbon atoms. Preferred examples of this class are the thiodipropionic and thiodibutyric acid diesters such as dilauryl thiodipropionate, distearyl thiodipropionate, dilauryl thiodibutyrate, and distearyl thiodibutyrate.

A complete discussion of useful sulfur-containing compounds, all of which are useful herein, can be found in the Rayner patent cited above.

For best results, the melamine should be reduced to a small particle size. The useful size range is from about 1 to 400μ, preferably 1 to 55μ, or even more preferably 1 to 10μ. This material, as supplied is frequently in larger particles than the above specified ranges. It can readily be reduced to the desired size by any known method such as by ball milling, roll milling, disc milling or jet milling. Ultrasonic methods can also be used.

The melamine can be added to the polymer by known means. A preferred method is by adding fine particles thereof to the polymer and mixing in the molten state on a Banbury mixer or the like. In some cases the incorporation can be carried out in the extruder. Deposition of the additive from a solution or dispersion in a volatile solvent is another useful alternative, but in this case, relatively vigorous agitation is necessary during solvent removal to prevent large crystal deposition.

It will usually happen that the polymer will already be compounded with the antioxidant and stabilizer additives as it is supplied by the manufacturer since it is usually desirable to have the same present during preparation of commercial forms of polymer. If not, these can be added simultaneously with the melamine, employing the same methods.

In the following examples, which illustrate the invention, parts and percentages are by weight unless otherwise specified. Samples were prepared for testing by incorporating 1.4 percent of electrolytic grade copper powder in the polymer in a Brabender Plastograph at 190° C. under a nitrogen atmosphere, and fluxing the mixture for 3 minutes. After removing the polymeric composition from the plastograph, it was pressed flat between aluminum plates and cooled rapidly. A portion of this material was then pressed into a 10-mil sheet for 1.5 minutes at 180° C. in an electrically heated press. Samples of this sheet (0.100 ± 0.002 g.) were then tested in an oxygen absorption tube immersed in a constant temperature bath at 140° C., using a mercury leveling device to follow absorption of oxygen. The method is described in detail by R.H.Hansen, et al., in the Journal of Polymer Science, Part A, 2, 587 (1964). The end of the induction period is marked by the absorption of 1.0 ml. of oxygen, at which time the mechanical and electrical properties have failed.

EXAMPLES 1-5

Samples were prepared containing stereoregular homopolypropylene and 0.25 percent distearyl thiodipropionate (DSTDP), 0.25 percent of the condensation product of 1 mole crotonaldehyde and 3 moles of 3-methyl-6-t-butylphenol and melamine at the level indicated in the table. Test results clearly show the improved copper resistance imparted by the melamine as well as the beneficial effect of small particle size. Test results (average of duplicate determinations) are as follows:

| Example No. | Melamine particle size (μ) | | | Melamine content, percent | Induction time, hours |
|---|---|---|---|---|---|
| | Max. | Min. | Average | | |
| Control | | | | 0 | <20 |
| 1 | 425 | 1 | 100 | 0.25 | 125 |
| 2 | 90 | 1 | 25 | 0.25 | 285 |
| 3 | 55 | 1 | 12 | 0.25 | 395 |
| 4 | 30 | 1 | 3.5 | 0.25 | 390 |
| 5 | 55 | 1 | 12 | 0.05 | 265 |

EXAMPLES 6-16

The above experiments were repeated using different combinations of phenolic antioxidants and sulfur compound in the same polymer with different levels of melamine of 12μ particle size.

The antioxidants employed were (A) 3-methyl-6-t-butylphenol--SCl$_2$ condensation product; (B) 2,4,6-tris(4-hydroxy-3,5-di-t-butylphenyl); (C) pentaerythritol tetra-β(4-hydroxy-3,5-di-t-butylphenyl) propionate; and (D) the condensation product of 1 mole of crotonaldehyde and 3 moles of 3-methyl-6-t-butylphenol. The sulfur compounds employed were dilauryl thiodipropionate (DLTDP), dilauryl thiodibutyrate (DLTDB), distearyl sulfide (DSS), stearyl mercaptan (SM), distearyl disulfide (DSDS), dihexadecyl sulfide (DHS), and distearyl thiodipropionate (DSTDP).

These formulations performed as follows;

| Example No. | Antioxidant | Percent | Sulfur compound | Percent | Percent melamine | Induction time, hrs. |
|---|---|---|---|---|---|---|
| Control | A | 0.25 | DSTDP | 0.25 | | <20 |
| 6 | A | 0.25 | DSTDP | 0.25 | 0.5 | 330 |
| 7 | B | 0.5 | DSTDP | 0.25 | 0.25 | 130 |
| 8 | C | 0.5 | DSTDP | 0.25 | 0.25 | 520 |
| 9 | D | 0.25 | DLTDP | 0.25 | 0.25 | 340 |
| 10 | D | 0.25 | DLTDP | 0.5 | 0.25 | 375 |
| 11 | C | 0.25 | DLTDB | 0.25 | 0.25 | 400 |
| 12 | C | 0.25 | DSS | 0.25 | 0.25 | 275 |
| 13 | A | 0.5 | SM | 0.5 | 0.25 | 225 |
| 14 | A | 0.5 | DSDS | 0.5 | 0.25 | 200 |
| 15 | D | 0.25 | DLTDB | 0.25 | 0.25 | 375 |
| 16 | D | 0.25 | DHS | 0.25 | 0.25 | 290 |
| Control | C | 0.25 | DSTDP | 0.25 | | <20 |

EXAMPLES 17-22

A copolymer of 25 percent ethylene and 75 percent propylene was formulated with 0.25 percent DSTDP and melamine and phenolic as indicated in the following table. The phenolic antioxidants employed were (D) the condensation product of 1 mole of crotonaldehyde and 3 moles of 3-methyl-6-t-butylphenol, and (E) the condensation product of butyraldehyde and 2 moles of 3-methyl-6-t-butylphenol.

| Example No. | Antioxidant | Percent | Percent melamine | Average particle size | Induction time (hrs.) |
|---|---|---|---|---|---|
| 17 | D | 0.25 | 0.1 | 12μ | 390 |
| 18 | D | 0.25 | 0.25 | 12μ | 390 |
| 19 | D | 0.25 | 0.5 | 12μ | 390 |
| 20 | E | 0.25 | 0.1 | 12μ | 154 |
| 21 | E | 0.25 | 0.25 | 12μ | 164 |
| 22 | E | 0.5 | 0.25 | 12μ | 205 |
| Control | E | 0.5 | | | 26 |

EXAMPLES 23-24

A copolymer of ethylene and about 1.4 percent butene-1 containing about 1.4 percent copper dust therein was formulated with about 0.25 percent DSTDP, about 0.25 percent of the condensation product of 1 mole crotonaldehyde and 3 moles of 3-methyl-6-t-butylphenol and either 0.25 or 0.5 percent melamine of 12μ average particle size. These specimens were subjected to the O$_2$ absorption test as described above except that the test was conducted at 130° C. Both specimens (0.25 and 0.5 percent melamine) failed after about 260 hours.

A control sample of the same polymer, containing no melamine, failed after about 60 hours.

An interesting ancillary benefit of this invention is that it increases the heat stability of the olefin polymers in contact with inorganic reinforcing fillers such as asbestos and talc. These materials have been found to contribute to relatively rapid degradation of the polymer apparently due to the presence of trace amounts of copper salts. The degradative effect of these salts is also overcome by the melamine.

In addition to basic melamine, it has been found that certain salts of melamine also contribute to increased copper stability. Exemplary, though not all inclusive of such salts, are the 1:1 salt of melamine with thiodipropionic acid, the 1:1 salt of melamine with salicylic acid, and the 2:1 salt of melamine with sulfuric acid.

What I claim and desire to protect by Letters Patent is:

1. A composition comprising a heat-stabilized polymer of an α-olefin having two to six carbon atoms containing, as a copper antagonist, about 0.01 to 2 percent melamine, based on the weight of said α-olefin polymer.

2. A composition which exhibits good resistance to oxidative degradation in the presence of copper which comprises a polymer of an olefin having two to six carbon atoms containing, based on the weight of said polymer, about 0.01 to 2 percent of melamine, about 0.01 to 2 percent of phenolic antioxidant having more than one phenolic residue and having sterically blocking group on at least one carbon atom adjacent to each phenolic hydroxyl group, and about 0 to 2 percent of an organic sulfur compound having a molecular weight of at least about 250 selected from the class consisting of (1) mercaptans, and disulfides, and (2) diesters of thiodialkanoic acids.

3. A composition which exhibits good resistance to oxidative degradation in the presence of copper which comprises a polymer of an olefin having two to six carbon atoms containing, based on the weight of said polymer, about 0.01 to 2 percent of melamine, about 0.01 to 2 percent of a phenolic antioxidant having more than one phenolic residue and having a sterically blocking group on at least one carbon atom adjacent to each phenolic hydroxyl group, and about 0 to 2 percent of an organic sulfur compound selected from the class consisting of (1) distearyl thiodipropionate, (2) dilauryl thiodipropionate, (3) dilauryl thiodibutyrate, (4) distearyl sulfide, (5) stearyl mercaptan, (6) distearyl disulfide, and (7) dihexadecyl sulfide.

4. The composition of claim 3 wherein the phenolic antioxidant is selected from the class consisting of (1) the condensation product of about 1 mole of crotonaldehyde and about 3 moles of 3-methyl-6-t-butyl phenol, (2) the condensation product of about 1 mole of butyraldehyde and 2 moles of 3-methyl-6-t-butylphenol, (3) pentaerythritol tetra-β(4-hydroxy-3,5-di-t-butylphenyl)propionate, (4) the condensation product of about 1 mole of $SCl_2$ with about 2 moles of 3-methyl-6-t-butylphenol, and (5) 2,4,6-tris(4-hydroxy-3,5-di-t-butylbenzyl)mesitylene.

5. The composition of claim 3 where the olefin polymer is selected from the class consisting of polypropylene and crystalline copolymers of propylene with up to about 25 percent ethylene.

6. The composition of claim 3 where the olefin polymer is selected from the class consisting of polyethylene and copolymers of ethylene with minor portions of a second α-olefin.

* * * * *